United States Patent [19]
Niihara et al.

[11] Patent Number: 5,970,180
[45] Date of Patent: Oct. 19, 1999

[54] ADAPTIVE FILTER DEVICE AND RELATED METHOD

[75] Inventors: Takami Niihara; Minae Terai, both of Yokosuka; Kouichi Sonoda, Kawasaki; Takeya Fujii, Yokohama, all of Japan

[73] Assignee: Victor Company of Japan, Ltd., Yokohama, Japan

[21] Appl. No.: 08/925,149

[22] Filed: Sep. 8, 1997

[30] Foreign Application Priority Data

Sep. 10, 1996 [JP] Japan .................................... 8-239078

[51] Int. Cl.⁶ ............................ G06K 9/40; G06T 5/00; G06T 7/20
[52] U.S. Cl. .......................... 382/261; 382/275; 382/278; 348/607
[58] Field of Search .................... 382/261, 236, 382/278, 260, 264, 275; 348/699, 415, 607, 620

[56] References Cited

U.S. PATENT DOCUMENTS 5,699,128 12/1997 Hayashi ................................. 348/699
5,847,772 12/1998 Wells ..................................... 348/571

*Primary Examiner*—Scott Rogers
*Attorney, Agent, or Firm*—Pollock, Vande Sande & Amernick

[57] ABSTRACT

A decision is made as to which of a first segment and a second segment of an input picture signal more correlates to a third segment of the input picture signal. The third signal segment is of interest. The first signal segment precedes the third signal segment by a 2-field interval or a 4-field interval. The second signal segment follows the third signal segment by a 2-field interval or a 4-field interval. Calculation is made as to a difference between the third signal segment and the more-correlating signal segment for every pixel related to the input picture signal. Every 1-pixel-corresponding portion of the third signal segment and every 1-pixel-corresponding portion of the more-correlating signal segment are mixed into a 1-pixel-corresponding portion of a filtering-resultant picture signal at a mixing ratio depending on the calculated difference.

2 Claims, 4 Drawing Sheets

| | F0 | F1 | F2 | F3 | F4 | F5 |
|---|---|---|---|---|---|---|
| PICTURE COMPONENT | Fe | Fo | Fe | Fo | Fe | Fo |
| GENERAL NOISE | N0 | N1 | N2 | N3 | N4 | N5 |
| CHROMA NOISE | C0 | C1 | C2 | C3 | C4 | C5 |

ADAPTIVE FILTER DEVICE AND RELATED METHOD

BACKGROUND OF THE INVENTION

1. Field of the Invention

This invention relates to an adaptive filter device for removing noise from a picture signal. This invention also relates to a method of adaptively filtering a picture signal.

2. Description of the Related Art

In a prior-art adaptive filter device for removing noise from a picture signal, a decision is made as to whether every 1-pixel-corresponding portion of an image represented by the picture signal is still or moving. Then, each segment of the picture signal which relates to a still 1-pixel-corresponding image portion is subjected to a filtering process in a temporal direction (a time-base direction). On the other hand, each segment of the picture signal which relates to a moving 1-pixel-corresponding image portion is not subjected to the filtering process. Thus, it tends to be difficult to remove temporal-direction noise from segments of the picture signal which represent moving image portions.

The temporal-direction noise decreases the quality of the image represented by the picture signal. In the case where the prior-art adaptive filter device is followed by a data compressing stage, the temporal-direction noise consumes bits of the compression-resultant picture signal. When the bit rate of the compression-resultant picture is limited to a low level, the temporal-direction noise considerably decreases the quality of images represented by the compression-resultant picture signal.

SUMMARY OF THE INVENTION

It is an object of this invention to provide an improved adaptive filter device.

The invention provides an adaptive filter device. A first decision circuit determines which of a first segment and a second segment of an input picture signal more closely correlates to a third segment of the input picture signal. The first signal segment precedes the third signal segment by a 4-field interval, and the second signal segment following the third signal segment by a 4-field interval. A first difference calculating circuit calculates a difference between the third signal segment and the more closely correlating signal segment determined by the decision circuit for every pixel related to the input picture signal. A mixing circuit mixes every 1-pixel-corresponding portion of the third signal segment, and every 1-pixel-corresponding portion of the more closely correlating signal segment determined by the decision circuit into a 1-pixel-corresponding portion of a first filtering-resultant picture signal at a mixing ratio depending on the first difference calculated by the difference calculation circuit. A second decision circuit determines which of a fourth segment and a fifth segment of the first filtering-resultant signal generated by the third means more closely correlates to a sixth segment of the first filtering-resultant picture signal. The fourth signal segment precedes the sixth signal segment by a 2-field interval, and the fifth signal segment following the sixth signal segment by a 2-field interval. A second difference calculating circuit calculates a difference between the sixth signal segment and the more closely correlating signal segment determined by the second decision circuit for every pixel related to the first filtering-resultant picture signal. A second mixing circuit mixes every 1-pixel-corresponding portion of the sixth signal segment and every 1-pixel-corresponding portion of the more closely correlating signal segment determined by the second decision circuit into a 1-pixel-corresponding portion of a second filtering-resultant picture signal at a mixing ratio depending on the difference calculated by the second difference circuit.

DESCRIPTION OF THE PREFERRED EMBODIMENTS

A prior-art adaptive filter device will be explained hereinafter for a better understanding of this invention.

Figures 1, 2:
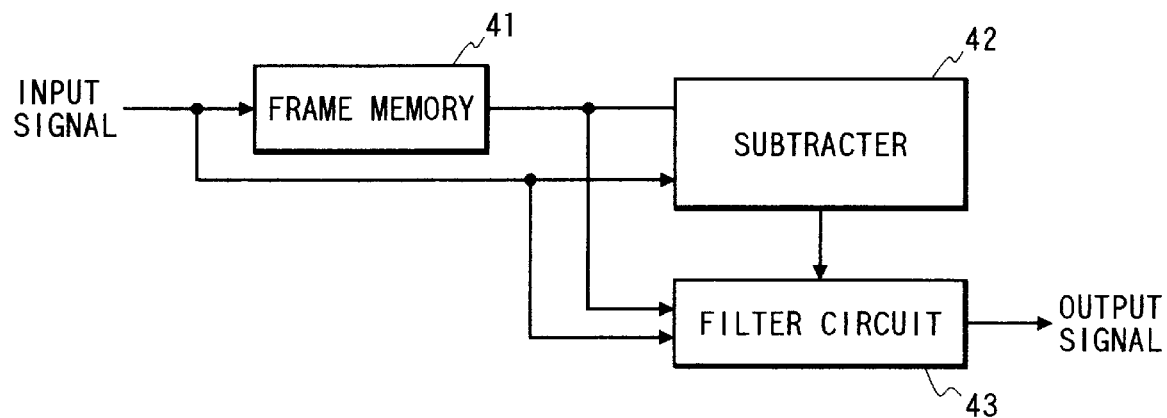
FIG. 1 is a block diagram of a prior-art adaptive filter device.
FIG. 2 is a diagram of 1-field-corresponding signal segments, picture components, general noise components, and chroma noise components.

FIG. 1 shows a prior-art adaptive filter device which includes a frame memory 41, a subtracter 42, and a filter circuit 43. In the prior-art adaptive filter device, an input digital picture signal is fed to the frame memory 41. The frame memory 41 temporarily stores the input digital picture signal, delaying the input digital picture signal by a time corresponding to one frame. The frame memory 41 outputs the delay-resultant picture signal to the subtracter 42. Also, the input digital picture signal is fed to the subtracter 42 as a non-delayed picture signal.

The subtracter 42 calculates the difference between the non-delayed picture signal and the delay-resultant picture signal. The subtracter 42 generates a difference signal in response to the calculated difference through given signal processing. The subtracter 42 outputs the difference signal to the filter circuit 43.

The signal processing by the subtracter 42 is implemented on a pixel-by-pixel basis. The signal processing by the subtracter 42 is equivalent to a decision as to whether every 1-pixel-corresponding portion of an image represented by the input digital picture signal is still or moving. Thus, the difference signal outputted from the subtracter 42 indicates the result of the decision as to whether every 1-pixel-corresponding portion of an image represented by the input digital picture signal is still or moving.

The input digital picture signal, that is, the non-delayed picture signal, is fed to the filter circuit 43. In addition, the delay-resultant picture signal is fed to the filter circuit 43 from the frame memory 41. The filter circuit 43 mixes the non-delayed picture signal and the delay-resultant picture signal into an output digital picture signal at a mixing ratio depending on the difference signal fed from the subtracter 42. The signal mixing by the filter circuit 43 is implemented on a pixel-by-pixel basis. The signal mixing by the filter circuit 43 corresponds to a filtering process on the input digital picture signal in a temporal direction (a time-base direction). Specifically, for a still 1-pixel-corresponding image portion, the non-delayed picture signal and the delay-resultant picture signal are mixed to implement the temporal-direction filtering process. For a moving 1-pixel-corresponding image portion, the signal mixing is inhibited to disable the temporal-direction filtering process. In this case, the non-delayed picture signal (the input digital picture signal) is passed through the filter circuit 43 while the delay-resultant picture signal is not used. Thus, in this case, the output digital picture signal is the same as the input digital picture signal.

In the prior-art adaptive filter device of FIG. 1, each segment of the input digital picture signal which relates to a moving 1-pixel-corresponding image portion is not subjected to the temporal-direction filtering process. Thus, it tends to be difficult to remove temporal-direction noise from segments of the input digital picture signal which represent moving image portions. The temporal-direction noise decreases the quality of the image represented by the input digital picture signal. In the case where the prior-art adaptive filter device of FIG. 1 is followed by a data compressing stage, the temporal-direction noise consumes bits of the compression-resultant picture signal. When the bit rate of the compression-resultant picture is limited to a low level, the temporal-direction noise considerably decreases the quality of images represented by the compression-resultant picture signal.

There is no correlation between two images represented by the input digital picture signal which occur before and after a scene change respectively. Therefore, the prior-art adaptive filter device of FIG. 1 does not execute the temporal-direction filtering process on the input digital picture signal related to a scene change. Similarly, the prior-art adaptive filter device of FIG. 1 does not execute the temporal-direction filtering process on the input digital picture signal representing an image in which a picture portion suddenly appears.

In some cases, a luminance signal and a carrier chrominance signal can not be sufficiently separated from each other during the conversion of a composite video signal to component video signals. In these cases (especially in the case of an NTSC color signal), the luminance signal is contaminated by the carrier chrominance signal whose phase cyclically changes at a period corresponding to four fields. The temporal-direction filtering process by the prior-art adaptive filter device of FIG. 1 uses a correlation between only two successive frames represented by the input digital picture signal. Accordingly, the prior-art adaptive filter device of FIG. 1 tends to be ineffective to chrominance-based noise in a luminance signal.

First Embodiment

The base of this invention will be explained hereinafter. With reference to FIG. 2, there is a sequence of segments F0, F1, F2, F3, F4, and F5 of an original luminance signal which relate to six successive fields, respectively. In FIG. 2, "Fe" denotes picture components related to even-numbered fields (corresponding to the signal segments F0, F2, and F4) while "Fo" denotes picture components related to odd-numbered fields (corresponding to the signal segments F1, F3, and F5).

It is assumed that the original luminance signal is contaminated by a carrier chrominance signal. Thus, for every field "i", the original luminance signal has chroma noise $C_i$ caused by the included carrier chrominance signal. In addition, for every field "i", the original luminance signal has other noise $N_i$ referred to as general noise.

Accordingly, the segments F0, F1, F2, F3, F4, and F5 of the original luminance signal are expressed as follows.

F0=Fe+N0+C0
F1=Fo+N1+C1
F2=Fe+N2+C2
F3=Fo+N3+C3
F4=Fe+N4+C4
F5=Fo+N5+C5

In addition, segments F6 and F7 of the original luminance signal which correspond to two subsequent fields are expressed as follows.

F6=Fe+N6+C6
F7=Fo+N7+C7

The difference between the signal segments F0 and F1 related to two successive fields is given as follows.

F0−F1=(Fe−Fo)+(N0−N1)+(C0−C1)

where the term "(Fe−Fo)" denotes an inter-field picture error; the term "(C0−C1)" denotes a chroma noise error; and the term "(N0−N1)" denotes a general noise error.

The difference between the signal segments F0 and F2 related to two fields separated by a 1-frame interval, that is, the signal difference between the two successive frames, is given as follows.

F0−F2=(Fe−Fe)+(N0−N2)+(C0−C2)

where the term "(Fe−Fe)" denotes an inter-frame picture error; the term "(C0−C2)" denotes a chroma noise error; and the term "(N0−N2)" denotes a general noise error. When the inter-frame picture error is null, the above-indicated equation is simplified as follows.

F0−F2=(N0−N2)+(C0−C2)

The difference between the signal segments F0 and F4 related to two fields separated by a 4-field interval (a 2-frame interval) is given as follows.

F0−F4=(Fe−Fe)+(N0−N4)+(C0−C4)

where the term "(Fe−Fe)" denotes a picture error; the term "(C0−C4)" denotes a chroma noise error; and the term "(N0−N4)" denotes a general noise error.

The carrier chrominance signal has a period corresponding to four fields. Accordingly, chroma noise $C_i$ and chroma noise $C(i+4)$ related to fields separated by a 4-field interval can be considered to be substantially equal to each other. When the picture error (Fe−Fe) and the chroma noise error (C0−C4) are null, the difference of the signal segments F0 and F4 is given as follows.

F0−F4=N0−N4

A 1-field-corresponding segment $F_i$ of the original luminance signal is filtered into a 1-field-corresponding segment $F_i'$ of the first filtering-resultant luminance signal according to a filtering process using simple addition between two fields separated by a 2-frame interval. For example, $F_i' = \{F_i+F(i+4)\}/2$. In this case, since $C_i=C(i+4)$ and $N_i+N(i+4)=\sqrt{2}N_i$, segments F0', F1', F2', F3', and F4' of the first filtering-resultant luminance signal which relate to five successive fields are expressed as follows.

$$F0' = Fe + (\sqrt{2}/2)N0 + C0$$
$$F1' = Fo + (\sqrt{2}/2)N1 + C1$$
$$F2' = Fe + (\sqrt{2}/2)N2 + C2$$
$$F3' = Fo + (\sqrt{2}/2)N3 + C3$$
$$F4' = Fe + (\sqrt{2}/2)N4 + C4$$

The difference between the signal segments F0' and F2' related to two fields separated by a 1-frame interval, that is, the signal difference between the two successive frames, is given as follows.

$$FO' - F2' = (Fe - Fe) + (\sqrt{2}/2)(N0 - N2) + (C0 - C2)$$

where the term "(Fe–Fe)" denotes an inter-frame picture error; the term "(C0–C2)" denotes a chroma noise error; and the term "($\sqrt{2}/2$)(N0–N2)" denotes a general noise error. When the inter-frame picture error is null, the above-indicated equation is simplified as follows.

$$FO' - F2' = (\sqrt{2}/2)(N0 - N2) + (C0 - C2)$$

The general noise error "($\sqrt{2}/2$)(N0–N2)" is smaller than that in the previously-indicated signal difference "F0–F2".

A 1-field-corresponding segment Fi' of the first luminance signal is filtered into a 1-field-corresponding segment Fi" of the second filtering-resultant luminance signal according to a filtering process using simple addition between two fields separated by a 1-frame interval. For example, Fi"={Fi'+F(i+2)'}/2. Since Ni+N(i+2)=$\sqrt{2}$Ni, a segment F0" of the second filtering-resultant luminance signal is expressed as follows.

F0"=Fe+($\frac{1}{2}$)N0+(C0+C2)/2

Since the chroma noise C0 and the chroma noise C2 have phases different from each other by 180 degrees, the chroma noise C0 and the chroma noise C2 cancel each other. Accordingly, the above-indicated equation is simplified as follows.

F0"=Fe+($\frac{1}{2}$)N0     (1)

Thus, the 1-field-corresponding segment F0" of the second filtering-resultant luminance signal is free from chroma noise. The level of the other noise (the general noise) in the 1-field-corresponding segment F0" of the second filtering-resultant luminance signal is lower than that in the 1-field-corresponding segment F0 of the original luminance signal by a factor of $\frac{1}{2}$.

Figure 3:
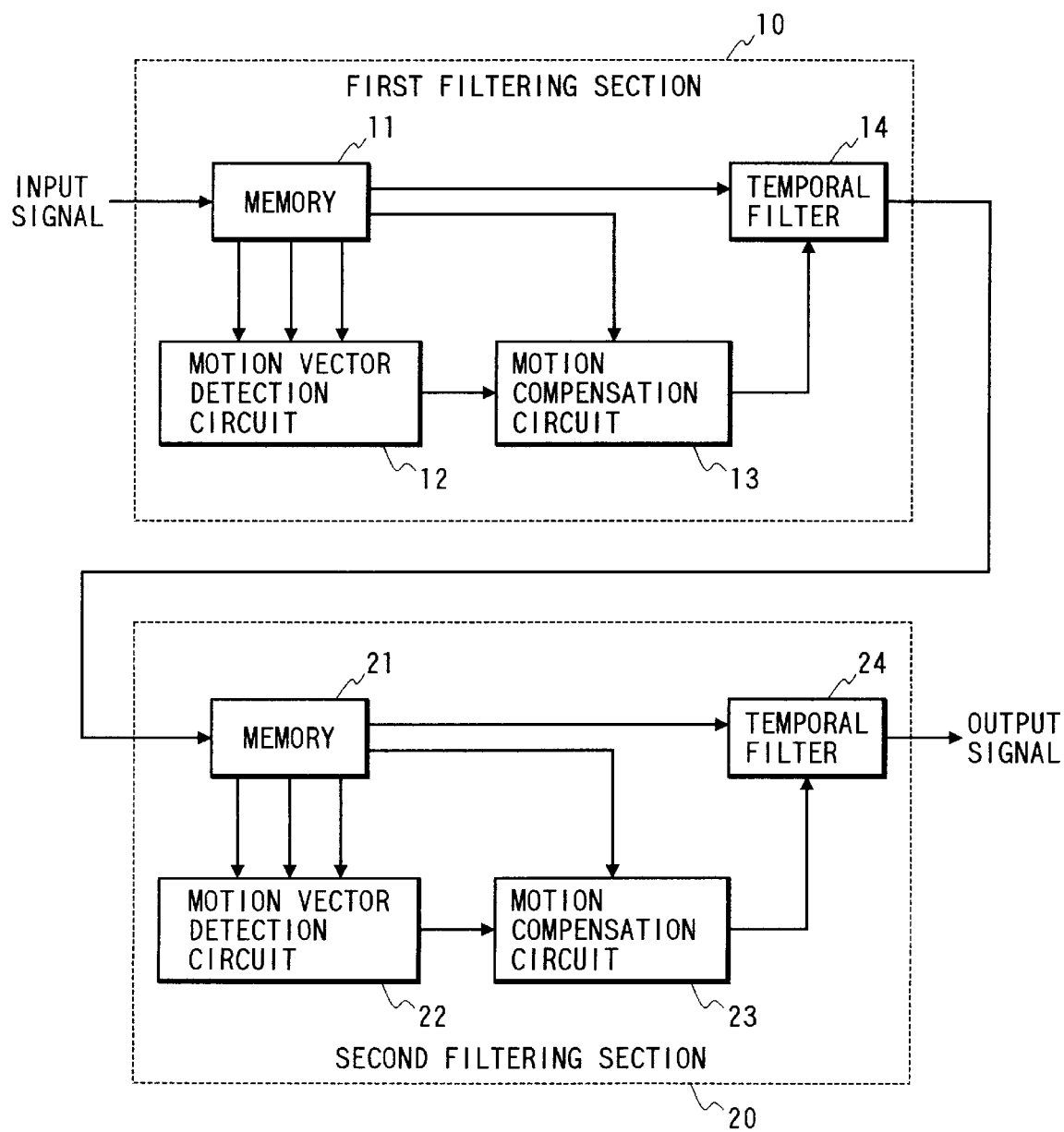
FIG. 3 is a block diagram of an adaptive filter device according to a first embodiment of this invention.

This invention will be explained in detail hereinafter. With reference to FIG. 3, an adaptive filter device has a first filtering section 10 and a second filtering section 20 connected in cascade or series. The first filtering section 10 includes a memory 11, a motion vector detection circuit 12, a motion compensation circuit 13, and a temporal filter 14. The memory 11 is connected to the motion vector detection circuit 12, the motion compensation circuit 13, and the temporal filter 14. The motion vector detection circuit 12 is connected to the motion compensation circuit 13. The motion compensation circuit 13 is connected to the temporal filter 14.

An input digital picture signal (also referred to as a first digital picture signal) is fed to the memory 11. Segments of the input digital picture signal (the first digital picture signal) which relate to ten successive fields are stored in the memory 11. The temporal filter 14 reads out a second digital picture signal from the memory 11 which is delayed from the first digital picture signal (the input digital picture signal) by a given time. The motion vector detection circuit 12 detects motion vectors by referring to signals fed from the memory 11. The motion vector detection circuit 12 outputs a signal of the detected motion vectors to the motion compensation circuit 13. The motion compensation circuit 13 reads out a reference digital picture signal from the memory 11 in response to the output signal of the motion vector detection circuit 12. The motion compensation circuit 13 feeds the reference digital picture signal to the temporal filter 14. The temporal filter 14 calculates the difference between the second digital picture signal and the reference digital picture signal. The temporal filter 14 mixes the second digital picture signal and the reference digital picture signal into a third digital picture signal (a first filtering-resultant digital picture signal) at a mixing ratio depending on the calculated difference. The difference calculation and the signal mixing by the temporal filter 14 is implemented on a pixel-by-pixel basis. The signal mixing by the temporal filter 14 corresponds to a filtering process on the input digital picture signal in a temporal direction (a time-base direction).

The second filtering section 20 includes a memory 21, a motion vector detection circuit 22, a motion compensation circuit 23, and a temporal filter 24. The memory 21 is connected to the motion vector detection circuit 22, the motion compensation circuit 23, and the temporal filter 24. The motion vector detection 22 is connected to the motion compensation circuit 23. The motion compensation circuit 23 is connected to the temporal filter 24.

The third digital picture signal (the first filtering-resultant digital picture signal) is fed from the first filtering section 10 to the memory 21 within the second filtering section 20. Segments of the third digital picture signal which relate to six successive fields are stored in the memory 21. The temporal filter 24 reads out a fourth digital picture signal from the memory 21 which is delayed from the third digital picture signal by a given time. The motion vector detection circuit 22 detects motion vectors by referring to signals fed from the memory 21. The motion vector detection circuit 22 outputs a signal of the detected motion vectors to the motion compensation circuit 23. The motion compensation circuit 23 reads out a reference digital picture signal from the memory 21 in response to the output signal of the motion vector detection circuit 22. The motion compensation circuit 23 feeds the reference digital picture signal to the temporal filter 24. The temporal filter 24 calculates the difference between the fourth digital picture signal and the reference digital picture signal. The temporal filter 24 mixes the fourth digital picture signal and the reference digital picture signal into a fifth digital picture signal (a second filtering-resultant digital picture signal) at a mixing ratio depending on the calculated difference. The difference calculation and the signal mixing by the temporal filter 24 is implemented on a pixel-by-pixel basis. The signal mixing by the temporal filter 24 corresponds to a filtering process on the input digital picture signal in a temporal direction (a time-base direction).

Figure 4:
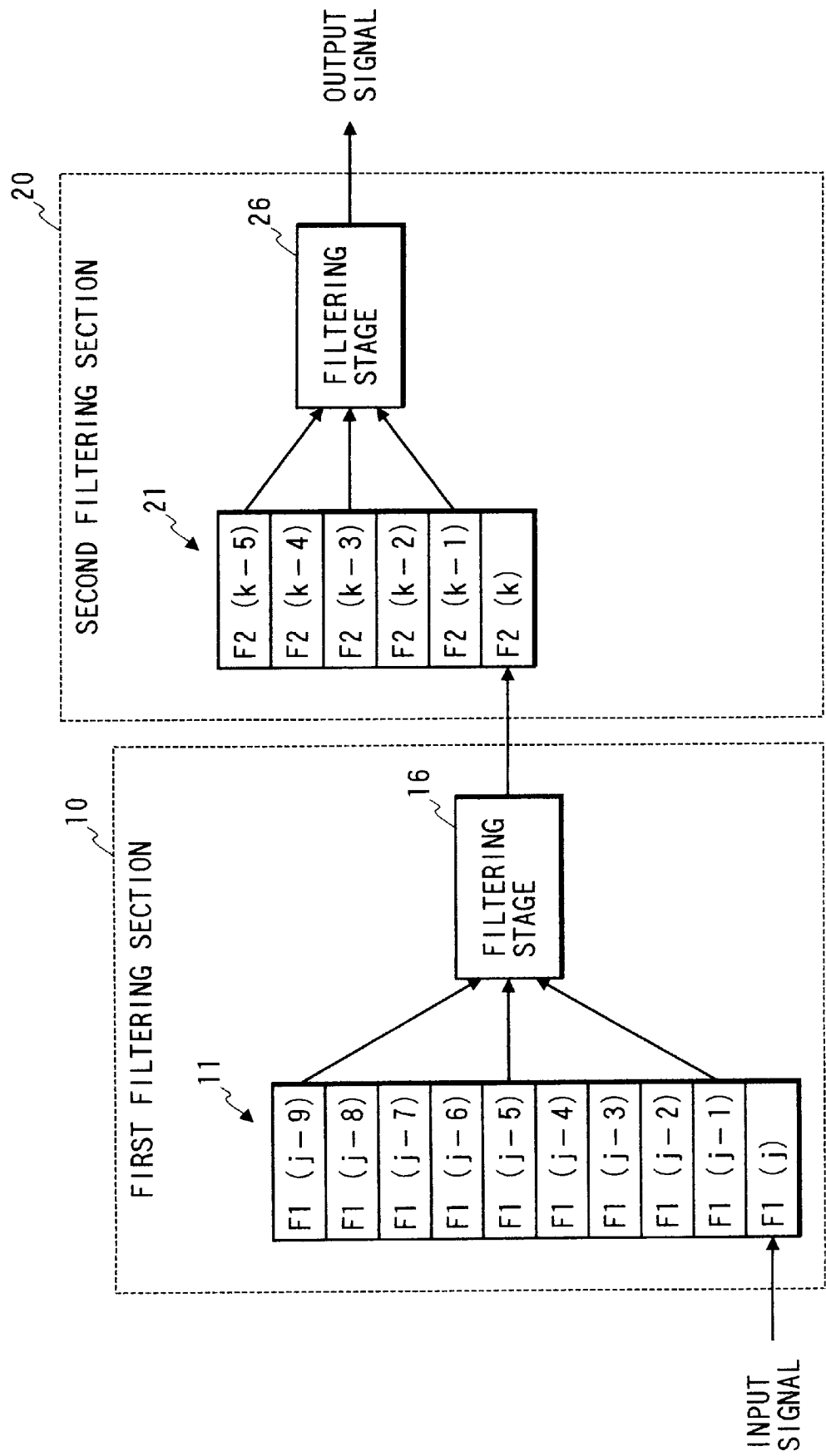
FIG. 4 is a flow diagram of operation of the adaptive filter device in FIG. 3.

With reference to FIG. 4, an input digital picture signal (also referred to as a first digital picture signal) is fed to the memory 11 within the first filtering section 10. Generally, the input digital picture signal is composed of a luminance signal and color difference (chrominance) signals. Segments of the input digital picture signal (the first digital picture signal) which relate to ten successive fields are stored in the memory 11. Each time a newest 1-field-corresponding segment of the input digital picture signal is written into the memory 11, the oldest 1-field-corresponding segment of the input digital picture signal is erased therefrom. Accordingly, ten successive 1-field-corresponding signal segments F1(j), F1(j-1), F1(j-2), ..., F1(j-5), ..., and F1(j-9) are held in the memory 11. Among them, the 1-field-corresponding signal segment F1(j-9) is the oldest while the 1-field-corresponding signal segment F1(j) is the newest.

In the first filtering section 10, a filtering stage 16 composed of the motion vector detection circuit 12, the motion compensation circuit 13, and the temporal filter 14 reads out the 1-field-corresponding signal segment F1(j-5) from the memory 11 as an object to be currently processed, that is, an object of interest. The 1-field-corresponding signal segment F1(j-5) follows the oldest 1-field-corresponding signal segment F1(j-9) in the memory 11 by a 4-field interval. The 1-field-corresponding signal segment F1(j-5) precedes the second newest 1-field-corresponding signal segment F1(j-1) in the memory 11 by a 4-field interval. The filtering stage 16 handles the 1-field-corresponding segment F1(j-5) of the first digital picture signal as a 1-field-corresponding segment of a second digital picture signal. The filtering stage 16 filters the 1-field-corresponding segment F1(j-5) of the first digital picture signal (that is, the 1-field-corresponding segment of the second digital picture signal) into a 1-field-corresponding segment F2(k) of a third digital picture signal. The third digital picture signal is also referred to as the first filtering-resultant digital picture signal.

Specifically, the motion vector detection circuit 12 in the filtering stage 16 reads out the luminance components of the 1-field-corresponding signal segments F1(j-1), F1(j-5), and F1(j-9) from the memory 11. The luminance components of the 1-field-corresponding signal segments F1(j-1), F1(j-5), and F1(j-9) are also referred to as the 1-field-corresponding luminance segments F1(j-1), F1(j-5), and F1(j-9). The 1-field-corresponding luminance segment F1(j-9) precedes the 1-field corresponding luminance segment F1(j-5) of interest by a 4-field interval. The 1-field-corresponding luminance segment F1(j-1) follows the 1-field corresponding luminance segment F1(j-5) of interest by a 4-field interval. The motion vector detection circuit 12 uses the 1-field-corresponding luminance segments F1(j-1) and F1(j-9) as reference 1-field-corresponding luminance segments for the 1-field-corresponding luminance segment F1(j-5) of interest.

The motion vector detection circuit 12 in the filtering stage 16 divides each of the fields represented by the 1-field-corresponding luminance segments F1(j-1), F1(j-5), and F1(j-9) into equal-size blocks of, for example, 16 by 16 pixels. The motion vector detection circuit 12 detects a motion vector for each block related to the 1-field-corresponding luminance segment F1(j-5) of interest relative to the reference 1-field-corresponding luminance segment F1(j-9). The detection of the motion vector for each block is implemented on a block matching basis. The motion vector detection circuit 12 evaluates the detected motion vector for each block related to the 1-field-corresponding luminance segment F1(j-5) of interest relative to the reference 1-field-corresponding luminance segment F1(j-9). In addition, the motion vector detection circuit 12 detects a motion vector for each block related to the 1-field-corresponding luminance segment F1(j-5) of interest relative to the reference 1-field-corresponding luminance segment F1(j-1). The detection of the motion vector for each block is implemented on a block matching basis. The motion vector detection circuit 12 evaluates the detected motion vector for each block related to the 1-field-corresponding luminance segment F1(j-5) of interest relative to the reference 1-field-corresponding luminance segment F1(j-1). In this way, the motion vector detection circuit 12 detects two motion vectors for each block. Then, the motion vector detection circuit 12 evaluates the two motion vectors for each block. The motion vector detection circuit 12 selects one out of the two motion vectors for each block which has a better evaluation result (which indicates a greater correlation). The motion vector detection circuit 12 informs the motion compensation circuit 13 of the selected motion vector as a final motion vector or a formal motion vector for each block.

For each block related to the selected motion vector which corresponds to the reference 1-field-corresponding luminance segment F1(j-1), the motion compensation circuit 13 in the filtering stage 16 reads out the luminance components and the color difference (chrominance) components of the reference 1-field-corresponding signal segment F1(j-1) from the memory 11 on a pixel-by-pixel basis. The motion compensation circuit 13 transmits the readout reference 1-field-corresponding signal segment F1(j-1) to the temporal filter 14 in the filtering stage 16 on a pixel-by-pixel basis. For each block related to the selected motion vector which corresponds to the reference 1-field-corresponding luminance segment F1(j-9), the motion compensation circuit 13 in the filtering stage 16 reads out the luminance components and the color difference (chrominance) components of the reference 1-field-corresponding signal segment F1(j-9) from the memory 11 on a pixel-by-pixel basis. The motion compensation circuit 13 transmits the readout reference 1-field-corresponding signal segment F1(j-9) to the temporal filter 14 in the filtering stage 16 on a pixel-by-pixel basis.

Accordingly, the motion vector detection circuit 12 and the motion compensation circuit 13 in the filtering stage 16 cooperate to decide which of the reference 1-field-corresponding signal segment F1(j-1) and the reference 1-field-corresponding signal segment F1(j-9) more correlates to the 1-field-corresponding signal segment F1(j-5) of interest on a block-by-block basis. Then, the motion vector detection circuit 12 and the motion compensation circuit 13 cooperate to select the reference 1-field-corresponding signal segment which has been decided to more correlate to the 1-field-corresponding signal segment F1(j-5) of interest. Subsequently, the motion vector detection circuit 12 and the motion compensation circuit 13 cooperate to feed the selected reference 1-field-corresponding signal segment to the temporal filter 14 in the filtering stage 16 on a pixel-by-pixel basis.

The temporal filter 14 in the filtering stage 16 reads out the luminance components and the color difference (chrominance) components of the 1-field-corresponding signal segment F1(j-5) from the memory 11 on a pixel-by-pixel basis. The temporal filter 14 calculates the difference between the signal segment F1(j-5) of interest and the reference signal segment F1(j-1) or F1(j-9) fed from the motion compensation circuit 13. The difference calculation by the temporal filter 14 is implemented on a pixel-by-pixel basis. The temporal filter 14 mixes the signal segment F1(j-5) of interest and the reference signal segment F1(j-1) or F1(j-9) fed from the motion compensation circuit 13 as follows. For every pixel, the temporal filter 14 mixes the signal segment F1(j-5) of interest and the reference signal segment F1(j-1) or F1(j-9) into the first filtering-resultant digital picture signal at a mixing ratio depending on the previously-indicated calculated difference. Preferably, the relation between the mixing ratio and the calculated difference is designed so that the mixing weight of the reference signal segment F1(j-1) or F1(j-9) will increase in accordance with a decrease in the calculated difference. The temporal filter 14 outputs the first filtering-resultant digital picture signal to the second filtering section 20.

An example of the mixing process by the temporal filter 14 is designed as follows. For every pixel, the temporal filter 14 compares the calculated difference with a predetermined threshold value. When the calculated difference is equal to or smaller than the predetermined threshold value, the temporal filter 14 adds and combines the signal segment F1(j-5) of interest and the reference signal segment F1(j-1) or F1(j-9) into the first filtering-resultant digital picture signal. In this case, addition-based arithmetic mean such as "{F1(j-5)+F1(j-1)}/2" or "{F1(j-5)+F1(j-9)}/2" is implemented. When the calculated difference is greater than the predetermined threshold value, the temporal filter 14 does not use the reference signal segment F1(j-1) or F1(j-9). In this case, the temporal filter 14 uses only the signal segment F1(j-5) of interest as the first filtering-resultant digital picture signal.

The first filtering-resultant digital picture signal is fed to the memory 21 within the second filtering section 20. Segments of the first filtering-resultant digital picture signal which relate to six successive fields are stored in the memory 21. Each time a newest 1-field-corresponding segment of the first filtering-resultant digital picture signal is written into the memory 21, the oldest 1-field-corresponding segment of the first filtering-resultant digital picture signal is erased therefrom. Accordingly, six successive 1-field-corresponding signal segments F2(k), F2(k-1), F2(k-2), F2(k-3), F2(k-4), and F2(k-5) are held in the memory 21. Among them, the 1-field-corresponding signal segment F2(k-5) is the oldest while the 1-field-corresponding signal segment F2(k) is the newest.

In the second filtering section 20, a filtering stage 26 composed of the motion vector detection circuit 22, the motion compensation circuit 23, and the temporal filter 24 reads out the 1-field-corresponding signal segment F2(k-3) from the memory 21 as an object to be currently processed, that is, an object of interest. The 1-field-corresponding signal segment F2(k-3) follows the oldest 1-field-corresponding signal segment F2(k-5) in the memory 21 by a 2-field interval. The 1-field-corresponding signal segment F2(k-3) precedes the second newest 1-field-corresponding signal segment F2(k-1) in the memory 21 by a 2-field interval. The filtering stage 26 handles the 1-field-corresponding segment F2(k-3) of the first filtering-resultant digital picture signal as a 1-field-corresponding segment of a fourth digital picture signal. The filtering stage 26 filters the 1-field-corresponding segment F2(k-3) of the first filtering-resultant digital picture signal (that is, the 1-field-corresponding segment of the fourth digital picture signal) into a 1-field-corresponding segment of a fifth digital picture signal. The fifth digital picture signal is also referred to as the second filtering-resultant digital picture signal.

Specifically, the motion vector detection circuit 22 in the filtering stage 26 reads out the luminance components of the 1-field-corresponding signal segments F2(k-1), F2(k-3), and F2(k-5) from the memory 21. The luminance components of the 1-field-corresponding signal segments F2(k-1), F2(k-3), and F2(k-5) are also referred to as the 1-field-corresponding luminance segments F2(k-1), F2(k-3), and F2(k-5). The 1-field-corresponding luminance segment F2(k-5) precedes the 1-field corresponding luminance segment F2(k-3) of interest by a 2-field interval. The 1-field-corresponding luminance segment F2(k-1) follows the 1-field corresponding luminance segment F2(k-3) of interest by a 2-field interval. The motion vector detection circuit 22 uses the 1-field-corresponding luminance segments F2(k-1) and F2(k-5) as reference 1-field-corresponding luminance segments for the 1-field-corresponding luminance segment F2(k-3) of interest.

The motion vector detection circuit 22 in the filtering stage 26 divides each of the fields represented by the 1-field-corresponding luminance segments F2(k-1), F2(k-3), and F2(k-5) into equal-size blocks of 16 by 16 pixels. The motion vector detection circuit 22 detects a motion vector for each block related to the 1-field-corresponding luminance segment F2(k-3) of interest relative to the reference 1-field-corresponding luminance segment F2(k-5). The detection of the motion vector for each block is implemented on a block matching basis. The motion vector detection circuit 22 evaluates the detected motion vector for each block related to the 1-field-corresponding luminance segment F2(k-3) of interest relative to the reference 1-field-corresponding luminance segment F2(k-5). In addition, the motion vector detection circuit 22 detects a motion vector for each block related to the 1-field-corresponding luminance segment F2(k-3) of interest relative to the reference 1-field-corresponding luminance segment F2(k-1). The detection of the motion vector for each block is implemented on a block matching basis. The motion vector detection circuit 22 evaluates the detected motion vector for each block related to the 1-field-corresponding luminance segment F2(k-3) of interest relative to the reference 1-field-corresponding luminance segment F2(k-1). In this way, the motion vector detection circuit 22 detects two motion vectors for each block. Then, the motion vector detection circuit 22 evaluates the two motion vectors for each block. The motion vector detection circuit 22 selects one out of the two motion vectors for each block which has a better evaluation result (which indicates a greater correlation). The motion vector detection circuit 22 informs the motion compensation circuit 23 of the selected motion vector as a final motion vector or a formal motion vector for each block.

For each block related to the selected motion vector which corresponds to the reference 1-field-corresponding luminance segment F2(k-1), the motion compensation circuit 23 in the filtering stage 26 reads out the luminance components and the color difference (chrominance) components of the reference 1-field-corresponding signal segment F2(k-1) from the memory 21 on a pixel-by-pixel basis. The motion compensation circuit 23 transmits the readout reference 1-field-corresponding signal segment F2(k-1) to the temporal filter 24 in the filtering stage 26 on a pixel-by-pixel basis. For each block related to the selected motion vector which corresponds to the reference 1-field-corresponding luminance segment F2(k-5), the motion compensation circuit 23 in the filtering stage 26 reads out the luminance components and the color difference (chrominance) components of the reference 1-field-corresponding signal segment F2(k-5) from the memory 21 on a pixel-by-pixel basis. The motion compensation circuit 23 transmits the readout reference 1-field-corresponding signal segment F2(k-5) to the temporal filter 24 in the filtering stage 26 on a pixel-by-pixel basis.

Accordingly, the motion vector detection circuit 22 and the motion compensation circuit 23 in the filtering stage 26 cooperate to decide which of the reference 1-field-corresponding signal segment F2(k-1) and the reference 1-field-corresponding signal segment F2(k-5) more correlates to the 1-field-corresponding signal segment F2(k-3) of interest on a block-by-block basis. Then, the motion vector detection circuit 22 and the motion compensation circuit 23 cooperate to select the reference 1-field-corresponding signal segment which has been decided to more correlate to the 1-field-corresponding signal segment F2(k-3) of interest. Subsequently, the motion vector detection circuit 22 and the motion compensation circuit 23 cooperate to feed the selected reference 1-field-corresponding signal segment to the temporal filter 24 in the filtering stage 26 on a pixel-by-pixel basis.

The temporal filter 24 in the filtering stage 26 reads out the luminance components and the color difference (chrominance) components of the 1-field-corresponding signal segment F2(k-3) from the memory 21 on a pixel-by-pixel basis. The temporal filter 24 calculates the difference between the signal segment F2(k-3) of interest and the reference signal segment F2(k-1) or F2(k-5) fed from the motion compensation circuit 23. The difference calculation by the temporal filter 24 is implemented on a pixel-by-pixel basis. The temporal filter 24 mixes the signal segment F2(k-3) of interest and the reference signal segment F2(k-1) or F2(k-5) fed from the motion compensation circuit 23 as follows. For every pixel, the temporal filter 24 mixes the signal segment F2(k-3) of interest and the reference signal segment F2(k-1) or F2(k-5) into the second filtering-resultant digital picture signal at a mixing ratio depending on the previously-indicated calculated difference. Preferably, the relation between the mixing ratio and the calculated difference is designed so that the mixing weight of the reference signal segment F2(k-1) or F2(k-5) will increase in accordance with a decrease in the calculated difference. The temporal filter 24 outputs the second filtering-resultant digital picture signal.

An example of the mixing process by the temporal filter 24 is designed as follows. For every pixel, the temporal filter 24 compares the calculated difference with a predetermined threshold value. When the calculated difference is equal to or smaller than the predetermined threshold value, the temporal filter 24 adds and combines the signal segment F2(k-3) of interest and the reference signal segment F2(k-1) or F2(k-5) into the second filtering-resultant digital picture signal. In this case, addition-based arithmetic mean such as "{F2(k-3)+F2(k-1)}/2" or "{F2(k-3)+F2(k-5)}/2" is implemented. When the calculated difference is greater than the predetermined threshold value, the temporal filter 24 does not use the reference signal segment F2(k-1) or F2(k-5). In this case, the temporal filter 24 uses only the signal segment F2(k-3) of interest as the second filtering-resultant digital picture signal.

Every 1-field-corresponding segment of the second filtering-resultant digital picture signal outputted from the temporal filter 24 in the second filtering section 20 is substantially equivalent to the 1-field-corresponding signal segment F0" expressed by the previously-indicated equation (1). Accordingly, the second filtering-resultant digital picture signal outputted from the temporal filter 24 is approximately free from chroma noise. The level of the other noise (the general noise) in the second filtering-resultant digital picture signal is lower than that in the original digital picture signal (the input digital picture signal) by a factor of about ½.

In the adaptive filter device of FIG. 3, the temporal filters 14 and 24 effectively operate on picture signal segments representing moving image portions. Accordingly, it is possible to remove temporal-direction noise from the picture signal segments representing the moving image portions.

In the adaptive filter device of FIG. 3, the motion vector detection circuit 12 and the motion compensation circuit 13 cooperate to select one out of the reference 1-field-corresponding signal segment F1(j-1) and the reference 1-field-corresponding signal segment F1(j-9) which follows and precedes the 1-field-corresponding signal segment F1(j-5) of interest by 4-field intervals respectively. The selected reference signal segment corresponds to a greater correlation. For every pixel, the temporal filter 14 subjects the signal segment F1(j-5) of interest to the filtering process in response to the selected reference signal segment. Similarly, the motion vector detection circuit 22 and the motion compensation circuit 23 cooperate to select one out of the reference 1-field-corresponding signal segment F2(k-1) and the reference 1-field-corresponding signal segment F2(k-5) which follows and precedes the 1-field-corresponding signal segment F2(k-3) of interest by 2-field intervals respectively. The selected reference signal segment corresponds to a greater correlation. For every pixel, the temporal filter 24 subjects the signal segment F2(k-3) of interest to the filtering process in response to the selected reference signal segment. Accordingly, the adaptive filter device of FIG. 3 is able to execute the temporal-direction filtering process on the input digital picture signal related to a scene change. In addition, the adaptive filter device of FIG. 3 is able to execute the temporal-direction filtering process on the input digital picture signal representing an image in which a picture portion suddenly appears.

Second Embodiment

Figure 5:
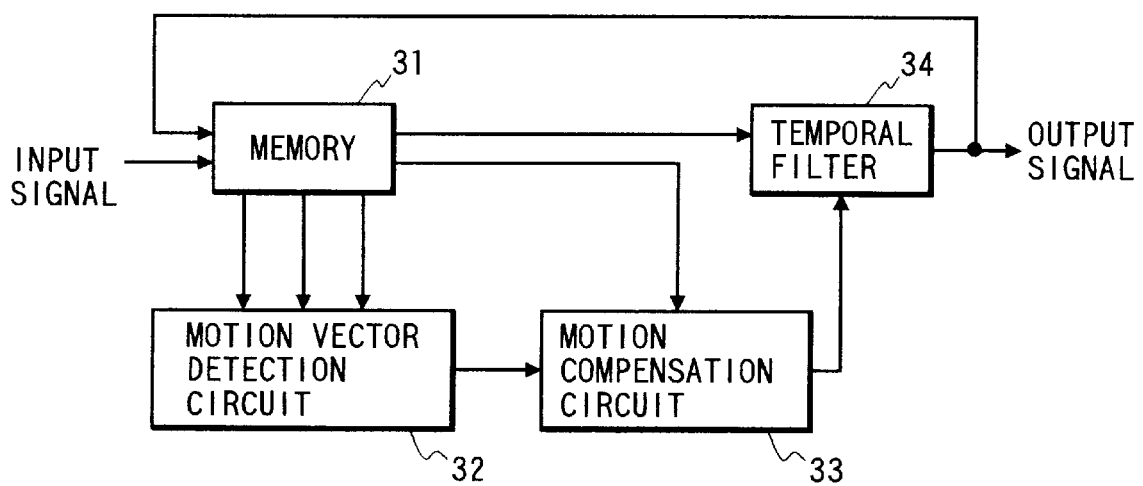
FIG. 5 is a block diagram of an adaptive filter device according to a second embodiment of this invention.

With reference to FIG. 5, an adaptive filter device includes a memory 31, a motion vector detection circuit 32, a motion compensation circuit 33, and a temporal filter 34. The memory 31 is connected to the motion vector detection circuit 32, the motion compensation circuit 33, and the temporal filter 34. The motion vector detection circuit 32 is connected to the motion compensation circuit 33. The motion compensation circuit 33 is connected to the temporal filter 34.

The memory 31 serves as the memory 11 and also the memory 21 in the embodiment of FIG. 3. The motion vector detection circuit 32 serves as the motion vector detection circuit 12 and also the motion vector detection circuit 22 in the embodiment of FIG. 3. The motion compensation circuit 33 serves as the motion compensation circuit 13 and also the motion compensation circuit 23 in the embodiment of FIG. 3. The temporal filter 34 serves as the temporal filter 14 and also the temporal filter 24 in the embodiment of FIG. 3.

An input digital picture signal is fed to the memory 31. The input digital picture signal is filtered into a first filtering-resultant digital picture signal by the combination of the memory 31, the motion vector detection circuit 32, the motion compensation circuit 33, and the temporal filter 34. The first filtering-resultant digital picture signal is outputted from the temporal filter 34 to the memory 31. The first filtering-resultant digital picture signal is filtered into a second filtering-resultant digital picture signal by the combination of the memory 31, the motion vector detection circuit 32, the motion compensation circuit 33, and the temporal filter 34. The second filtering-resultant digital picture signal is outputted from the temporal filter 34.

What is claimed is:

1. An adaptive filter device comprising:

first means for deciding which of a first segment and a second segment of an input picture signal more correlates to a third segment of the input picture signal, the third signal segment being of interest, the first signal segment preceding the third signal segment by a 4-field interval, the second signal segment following the third signal segment by a 4-field interval;

second means for calculating a difference between the third signal segment and the more-correlating signal segment which is decided by the first means for every pixel related to the input picture signal;

third means for mixing every 1-pixel-corresponding portion of the third signal segment and every 1-pixel-corresponding portion of the more-correlating signal segment which is decided by the first means into a 1-pixel-corresponding portion of a first filtering-resultant picture signal at a mixing ratio depending on the difference calculated by the second means;

fourth means for deciding which of a fourth segment and a fifth segment of the first filtering-resultant signal generated by the third means more correlates to a sixth segment of the first filtering-resultant picture signal, the sixth signal segment being of interest, the fourth signal segment preceding the sixth signal segment by a 2-field interval, the fifth signal segment following the sixth signal segment by a 2-field interval;

fifth means for calculating a difference between the sixth signal segment and the more-correlating signal segment which is decided by the fourth means for every pixel related to the first filtering-resultant picture signal; and sixth means for mixing every 1-pixel-corresponding portion of the sixth signal segment and every 1-pixel-corresponding portion of the more-correlating signal segment which is decided by the fourth means into a 1-pixel-corresponding portion of a second filtering-resultant picture signal at a mixing ratio depending on the difference calculated by the fifth means.

2. A method comprising the steps of:

1) deciding which of a first segment and a second segment of an input picture signal more correlates to a third segment of the input picture signal, the third signal segment being of interest, the first signal segment preceding the third signal segment by a 4-field interval, the second signal segment following the third signal segment by a 4-field interval;

2) calculating a difference between the third signal segment and the more-correlating signal segment which is decided by the step 1) for every pixel related to the input picture signal;

3) mixing every 1-pixel-corresponding portion of the third signal segment and every 1-pixel-corresponding portion of the more-correlating signal segment which is decided by the step 1) into a 1-pixel-corresponding portion of a first filtering-resultant picture signal at a mixing ratio depending on the difference calculated by the step 2);

4) deciding which of a fourth segment and a fifth segment of the first filtering-resultant signal generated by the step 3) more correlates to a sixth segment of the first filtering-resultant picture signal, the sixth signal segment being of interest, the fourth signal segment preceding the sixth signal segment by a 2-field interval, the fifth signal segment following the sixth signal segment by a 2-field interval;

5) calculating a difference between the sixth signal segment and the more-correlating signal segment which is decided by the step 4) for every pixel related to the first filtering-resultant picture signal; and 6) mixing every 1-pixel-corresponding portion of the sixth signal segment and every 1-pixel-corresponding portion of the more-correlating signal segment which is decided by the step 4) into a 1-pixel-corresponding portion of a second filtering-resultant picture signal at a mixing ratio depending on the difference calculated by the step 5).

* * * * *